May 12, 1970  A. E. GILLMORE  3,510,921
QUICK RELEASE DEVICES
Filed March 29, 1968  3 Sheets-Sheet 1
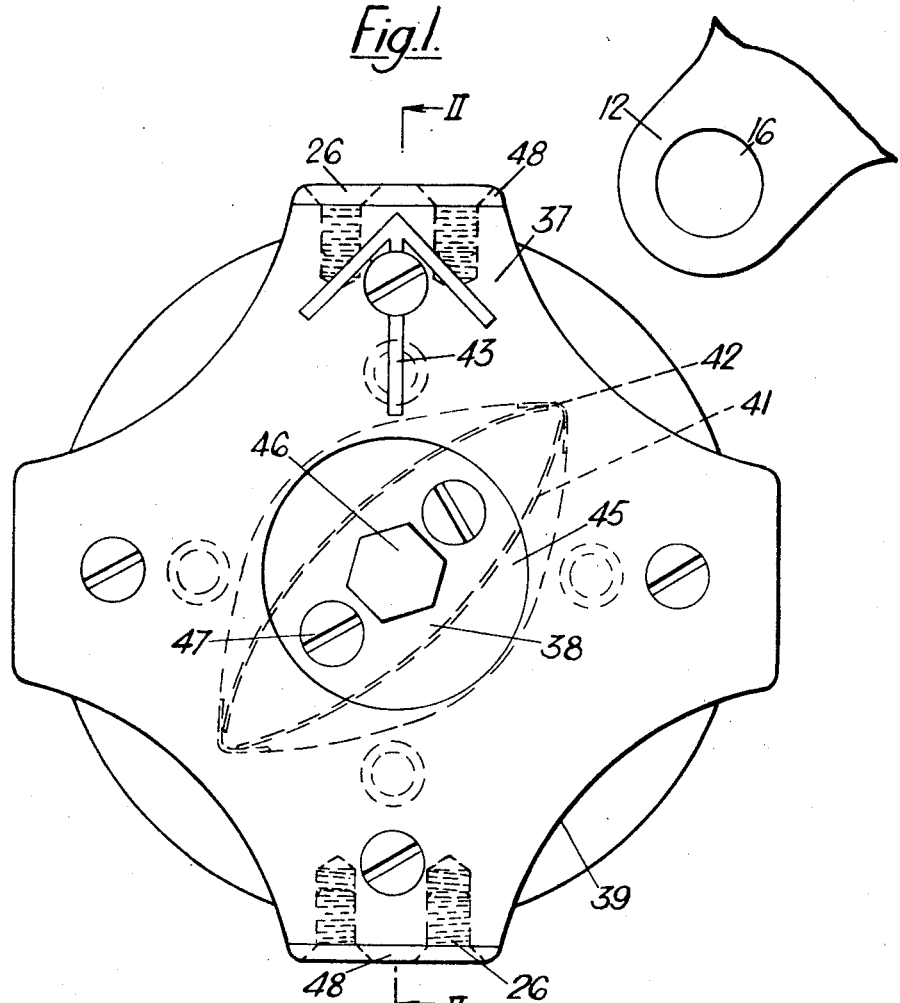
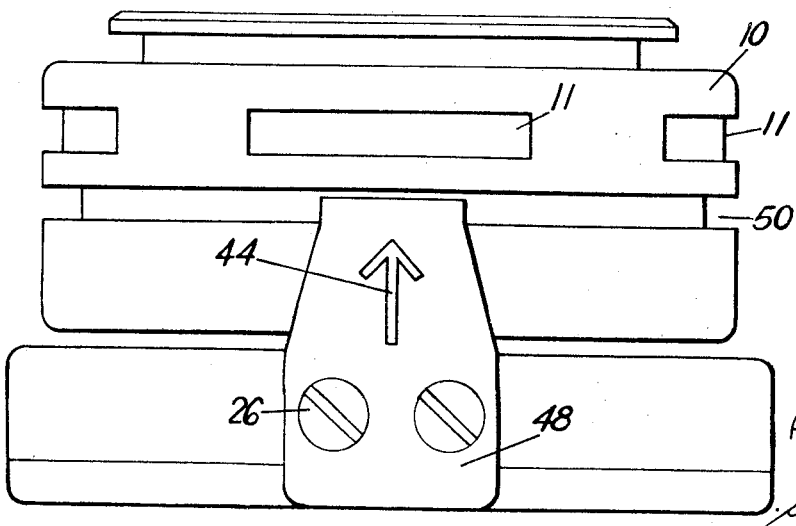
Inventor
ALFRED EDWARD GILLMORE
By
Shoemaker and Mattare
Attorneys May 12, 1970     A. E. GILLMORE     3,510,921

QUICK RELEASE DEVICES

Filed March 29, 1968     3 Sheets-Sheet 2

Inventor
ALFRED EDWARD GILLMORE
By
Shoemaker and Mattare
Attorneys

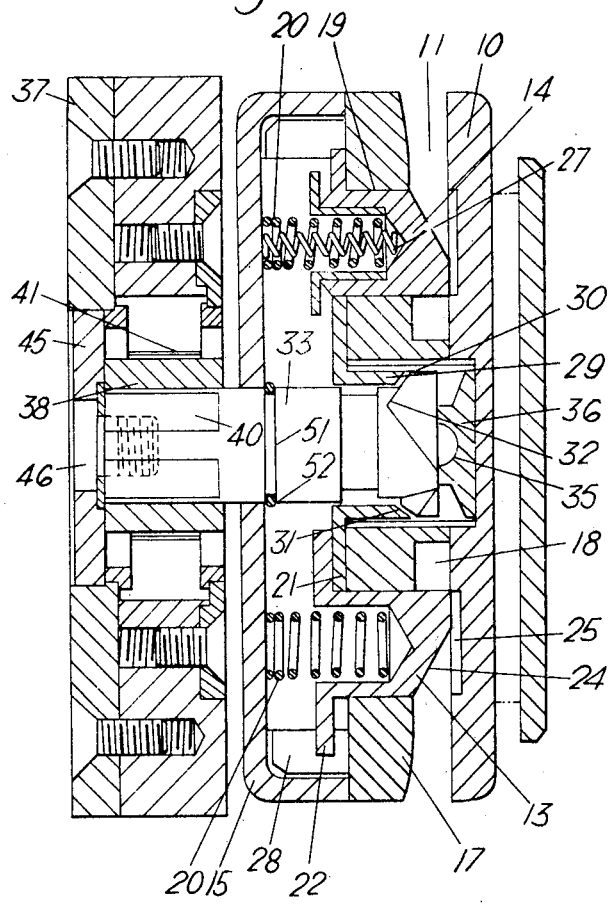

United States Patent Office 3,510,921
Patented May 12, 1970

3,510,921
QUICK RELEASE DEVICES
Alfred Edward Gillmore, Woking, Surrey, England, assignor to G.Q. Parachute Company, Limited, Woking, Surrey, England, a British company
Filed Mar. 29, 1968, Ser. No. 717,336
Int. Cl. A44b *11/25;* B64d *17/30*
U.S. Cl. 24—205.17                                5 Claims

ABSTRACT OF THE DISCLOSURE

A quick release device for a parachutist's harness of the type which holds a number of lugs, connected to the harness, on spigots inside the release device, the lugs being released from the spigots when a control plate is turned has a locking means such as plates on one part of the device engaging a groove on another part, or a circlip in a groove in one part which rests against a plate on the other part, to prevent accidental axial movement of the two parts which might release the lugs.

---

This invention relates to quick release devices for harness for personal wear, for example for parachutists, and particularly to the type of release device which holds a number of lugs, connected to the harness, on spigots inside the release device, the lugs being released from the spigots when a control plate is turned, turned and pressed, or moved in some other way as determined by the design of the device.

In such devices the spigots are usually spring pressed, the springs pressing directly on the spigots, on a plate carrying the spigots, or on a plate co-operating with the spigots.

It has been found that devices of this type can come unfastened under the effect of the forces produced by high accelerations, and also if sufficient force is applied between the control plate and the body of the device as might happen if the device were caught in part of the structure of an aircraft.

The object of this invention is to prevent the involuntary release of the harness lugs.

According to this invention, a quick release device for holding a number of lugs, such as lugs attached to a harness for a parachutist, comprises in combination a body, a control member mounted on said body and capable of rotary movement relative thereto, and spigots for holding the lugs, the control member being provided with means which prevents movement of the control member towards and/or away from the said body.

Again according to this invention a quick release device for holding a number of lugs, such as lugs attached to the harness of a parachutist, comprises in combination, a body, a control member mounted on said body and spigots for holding the lugs, the control member being connected to a spindle which is mounted within the said body and which rotates, when the control member is rotated, to move the spigots away from the said lugs and allow the lugs to escape from the device, in which means are provided to prevent axial movement of the control member relative to the said body.

The said means may comprise plates rigidly attached to the control member having bent over ends which engage a suitable groove in the body or may comprise a circlip in a groove on the spindle which rests against a cap member rigidly connected to the body.

Figure 2:
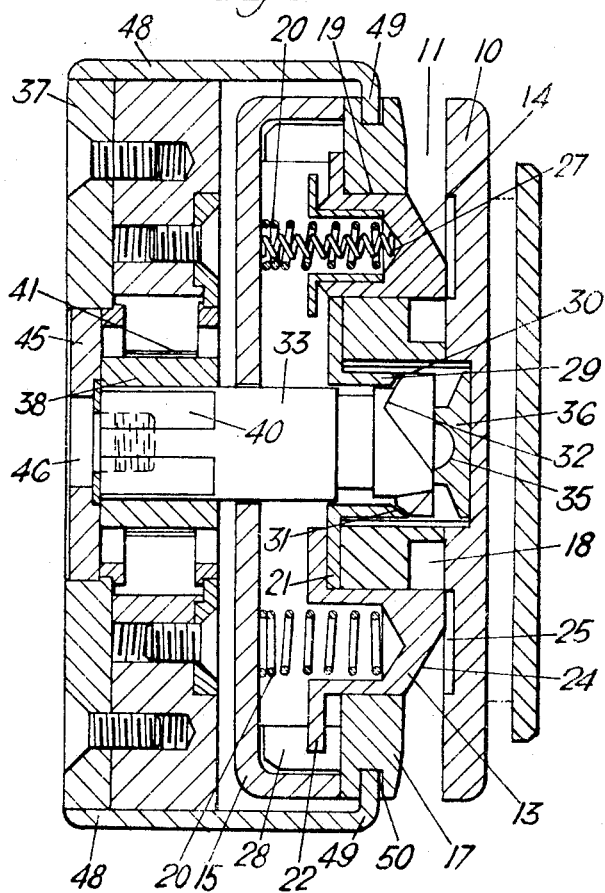
Figure 4:
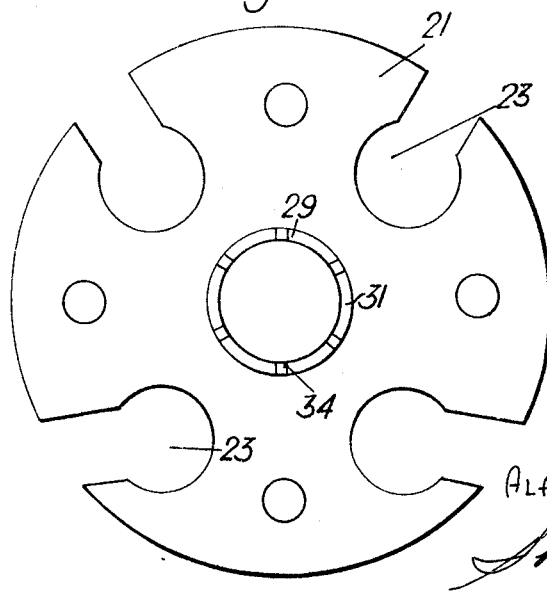

The invention is described hereinafter with reference to the accompanying drawings of which FIG. 1 is a plan view of one form of release box according to the invention, FIG. 2 is a sectional view of the box shown in FIG. 1 on the line II—II of that figure, FIG. 3 is an end view of the box shown in FIG. 1, FIG. 4 is a plan of a part of the box shown in FIG. 1 and FIG. 5 is a sectional view, similar to that shown in FIG. 2, but of an alternative form of the invention.

As shown in FIGS. 1 to 4, the box comprises a body 10, a detachable cap member 15 and a control member 37 which is connected to a cam spindle 33, and plates 48 which engage a groove 50 in partition 17 which is integral with or rigidly connected to the body 10.

The body 10 is formed with slots 11 for receiving the lug-fitted ends of the harness straps, one only of which is shown at 12 in FIG. 1 ready for engagement with the releasable locking bolt 13.

The detachable cap member 15 fits upon the body 10 in the manner of a box-lid, the two parts being connected together by a number of screws, not shown, extending parallel to the axis of the body 10. Inside the body 10 is a partition 17, which is integral with the body 10, the whole being made, for example, by die casting. This partition has, on one face, notches 18 registering at their outer ends with soles 11 in the wall of body 10, the inner ends of the notches being of shapes to suit the strap lugs 12. A number of bores 19 extend from these notches through the partition to receive the locking bolts 13, 14 which are controlled by coil springs 20 urging them into engagement with the lugs 12.

A releasing plate 21, normally pressing against the face of the partition 17, as seen in FIG. 2, engages under the heads 22 of the locking bolts 13, being formed for this purpose with slots 23 of keyhole shape, as seen in FIG. 4, so that by axial movement of the plate 21 these bolts can be drawn through the bores 19 in which they slide, thereby releasing their other ends from the strap lugs 12. It will be noted that locking bolt 14, which is arranged to be retained on the harness when the other lugs are released, is provided with an additional spring 27 and is not provided with a head 22 like the other bolts but is made slightly smaller than the inner end of the corresponding slot 23 in the releasing plate 21; so that the movement of the plate 21 does not release the strap engaged by the fixed locking bolt 14.

The ends of the locking bolts which engage with the strap lugs are bevelled as indicated at 24 to facilitate the entrance of the lugs into place, the bevel being preferably limited to about one half of their circular area, so that the subsisting flat portions of that area afford greater strength to withstand the pull of the straps than in the case of a level or incline extending over the whole of the area; further the locking bolts may be arranged to enter slightly into shallow wells 25 formed on the end or base of the slotted body 10, their engagement in such wells giving them added support to resist the pull.

The springs 20 operating the locking bolts are housed inside the latter, for example in holes drilled from the headed or flanged ends, a few coils of each spring projecting beyond the ends. After the bolts and their springs have been fitted they may be retained in place by a sealing disc (not shown) held flat against the annular wall or flange 28 of the body 10 until the cap member 15 is fitted.

The releasing plate 21 is provided centrally with a hollow boss or sleeve 29 slidable in a central hole 30 in the partition 17, the projecting end of the boss or sleeve being cut to form two opposite face cams 31 whereby the plate 21 may be moved axially by corresponding face cams 32 upon a spindle 33 passing through the boss or sleeve and through a registering hole in the cap member 15; the pair of face cams on the boss or sleeve may have steps or notches 34 near their highest points, for retaining the plate 21 in a released position. The helical angle or pitch of these cams 31, 32 is preferably made steep, for example with a helical angle of approximately 45°, to allow for the required travel of the locking bolts, slightly increased by the provision of the wells 25 in which they engage when locked.

The pressure of the springs 20 upon the locking bolts causes the flanges 22 to press against the plate 21, holding the face cams 31, 32 in engagement; the axial thrust thereby exerted on the cam spindle 33 is taken by a ball 35 seated in the inner end of a thrust block 36 located centrally in the bottom of the hole 30 in the end or base of the body 10.

The control member 37 is mounted upon the end of the cam spindle 33 and connected thereto by a spring coupling device which allows the member 37 to be turned, for example through 20° in either direction before operating the spindle and cam mechanism. As shown in the figures the spring coupling comprises a double cam 38 mounted upon the squared portion 40 of the spindle, and a pair of spring blades 41 pressing against opposite sides of the cam, these spring blades engaging in an elliptical or lenticular cavity 42 inside the boss of the control member. Angular movement of the control member will first cause the springs 41 to be flexed outwardly against the walls of the cavity and thereafter to transmit the motion to the cam and spindle so as to operate the face cams 32 and produce the axial movement of the releasing plate.

An external cover plate 45 is secured by a central screw 46 engaging the extremity of the cam spindle and by two screws 47 engaged in tapped holes in the opposite lobes of the double cam 38.

The control member 37 is provided with two retaining plates 48 which are fixed to the control member by screws 26. The ends of the plates are bent over as shown at 49 to engage a groove 50 cut in the body 10. The groove is made slightly wider than the thickness of the plates 48 so that the control member can be rotated without the plates rubbing against the groove 50. The plates however prevent movement of the control member towards and away from the body 10.

Visual indicators, such as the arrows 43 and 44 can be provided on the control member and on the plates to indicate when the box is and is not in the locked position. The control member has cut away portions 39 to assist the wearer in turning the control member. These cut away portions also give the wearer an indication by feel of the position of the control member.

As an additional precaution against the box being accidentally released by being caught by a projection, the harness can be provided with a cover which would be fastened across the box. The cover could be a piece of webbing or the like carried by a sleeve on one of the straps of the harness, preferably that connected to the fixed locking bolt 14, which is of sufficient length to cover the box and is provided at its free end with fastening means, such as a strip of touch tape such as is sold under the Registered Trademark "Velcro," which fastens to another of the straps of the harness joined to another of the locking bolts. The cover is held across the control member of the box when the fastening means is secured.

The invention is not restricted to a release box for retaining four lugs; it can be applied to boxes for retaining less than four lugs, or more than four lugs. Neither is the invention restricted to boxes having means to retain one of the lugs when the other lugs are released. More than one of the lugs could be retained if desired, or all the lugs could be released. It might be desirable to provide means other than the retained lug for attaching the box to the harness, such as a slotted plate attached to the box to which a strap of the harness could be attached by stitching.

In the embodiment described above the plates are symmetrically spaced on the control member. The plates could be placed unsymmetrically if desired. The invention is not restricted to the use of two retaining plates. One plate, or more than two plates, can be provided if desired.

In the embodiment the retaining plates are held by a groove in the body of the device. Other means could be provided to hold the ends of the retaining plates, for example a pair of spaced rings could be fixed to the body of the device.

The retaining means can be fixed to the body and engage any suitable groove, ring or rings carried by the control member, such as, for example a ring fixed to the underside of the control member.

FIG. 5 shows a second form of the quick release device according to the invention. The device is similar to that shown in FIG. 2 except the groove 50 and retaining plates 48 are replaced by a groove 51 cut in the spindle 33 and a circlip 52 which rests against the cap member 15. Normal operation of this device is identical to that described above for the device shown in FIGS. 1 to 4.

What I claim is:
1. A quick-release device for holding a number of lugs, such as lugs attached to a parachute harness, comprising:
 a body including spaced end portions and an intermediate partition;
 a spindle mounted for rotation in said body and extending through one of said end portions and said partition, said spindle including cam means at one end;
 a follower mounted on one side of said partition and having cam means thereon for cooperation with said spindle cam means, said follower movable axially of said spindle upon rotation of the spindle;
 a control member mounted upon the other end of said spindle for rotation thereof;
 a plurality of spring-biased locking means within said body for securing said lugs to the body, said locking means operatively connected with said follower for movement against spring bias to a position unlocking said locking means and releasing said lugs; and
 means for restraining said spindle against accidental axial movement in a bolt withdrawing direction, comprising, said springs biasing said locking means, and holding means comprising shoulder means connected to said spindle and in cooperative engagement with means on said body.

2. A quick-release device as in claim 1, wherein at least one retaining plate is fixed to said control member and extends to adjacent said body and said shoulder means is on said retaining plate and is in cooperative abutting relationship with means on said body.

3. A quick-release device as in claim 2, wherein said shoulder means comprises bent over ends on said at least one retaining plate engaged in a suitable groove in said body.

4. A quick-release device as in claim 1, wherein said shoulder means is connected to said spindle intermediate its ends and is in cooperative engagement with means on said one body end portion.

5. A quick-release device as in claim 4, wherein said shoulder means comprises a circlip which is secured in a groove in said spindle and rests against said one body end portion.

References Cited

UNITED STATES PATENTS 2,255,258   9/1941   Lethern _____ 24—205.17 X

FOREIGN PATENTS 1,148,464   5/1963   Germany.
656,977   9/1951   Great Britain.
686,192   1/1953   Great Britain.

BERNARD A. GELAK, Primary Examiner.